Nov. 18, 1947.  C. J. STUART  2,430,964
STOP AND SYNCHRONIZED DRIVE MECHANISM
Filed Nov. 18, 1944
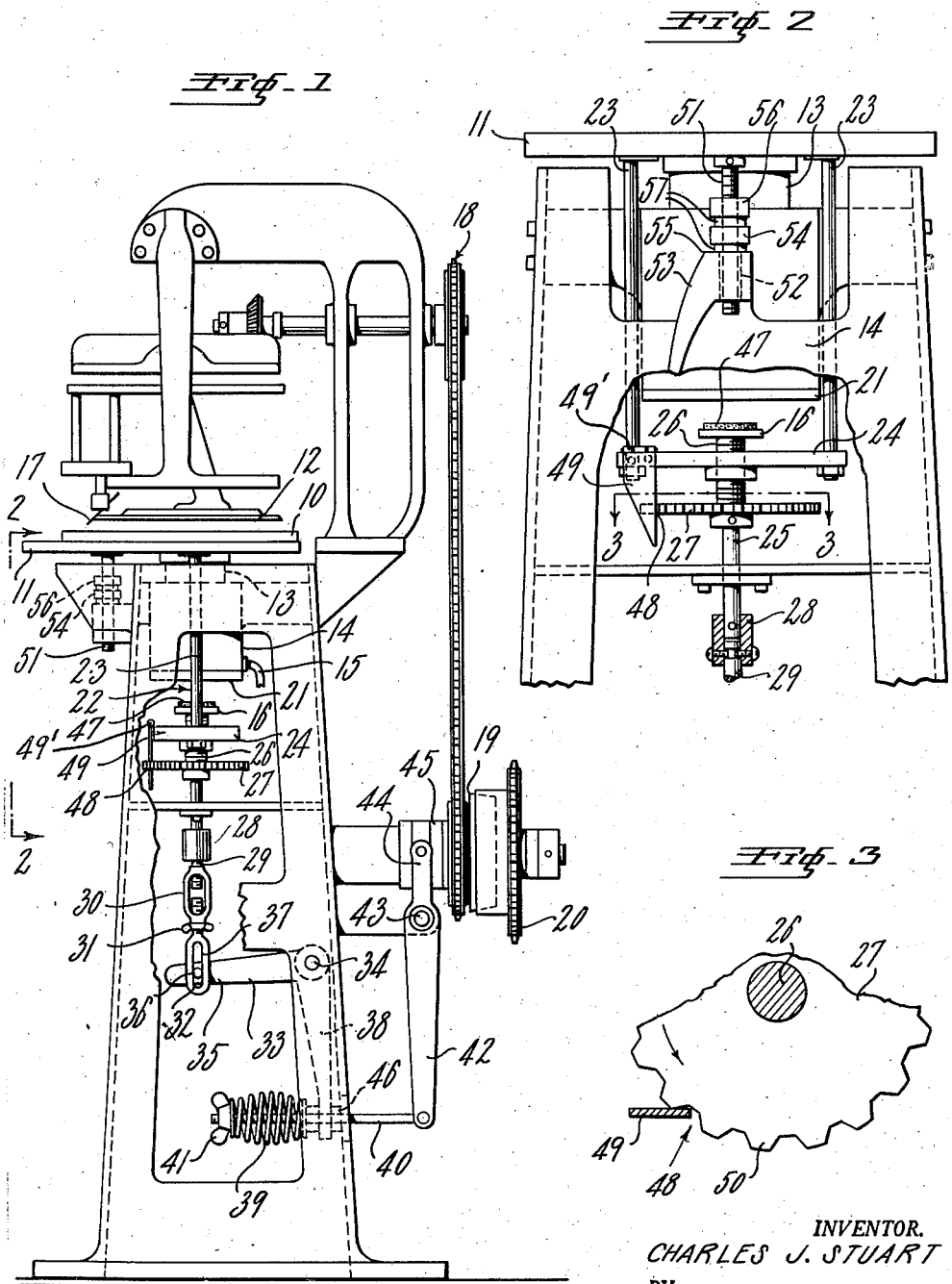
INVENTOR.
CHARLES J. STUART
BY
Lester J. Buslong
ATTORNEY Patented Nov. 18, 1947

2,430,964

UNITED STATES PATENT OFFICE 2,430,964

STOP AND SYNCHRONIZED DRIVE MECHANISM

Charles J. Stuart, Winchester, Mass., assignor to Wellman Company, Medford, Mass., a corporation of Maine Application November 18, 1944, Serial No. 564,109

5 Claims. (Cl. 12—25)

This invention relates to a machine for cutting a form, such as a shoe sole, from a piece of sheet stock while the stock is clamped with a predetermined pressure between a movable table and an abutment. The invention relates particularly to an improved mechanism for synchronizing the clamping and the cutting operations and maintaining such synchronism to reproduce the last set clamping pressure after being adjusted for any one of several stock thicknesses.

This invention is an improvement upon a machine disclosed in my prior U. S. Patent No. 2,284,308, issued May 26, 1942. In the prior machine the table was operated by a piston having a rod attached thereto and extending through the cylinder head. A mechanism for synchronizing the clamping and cutting operations was connected to the rod and a fluid pressure motor was interposed in such mechanism for actuating a clutch to connect the stock cutter to a power drive when a predetermined clamping pressure was exerted on the stock between the table and the abutment. In this prior machine, the friction of the packing around the rod on the cylinder head increased the operating pressure in the cylinder and the lack of a positive mechanical connection between the piston and the clutch, resulting from the use of the fluid pressure motor, reduced the accuracy of the synchronized action of the clamping and cutting operations.

In the present machine the synchronizing mechanism comprises a positive mechanical linkage connected to the table and it does not pass through the cylinder head. The construction eliminates the rod packing in the cylinder head and lowers the previously required pressure in the cylinder. The positive mechanical linkage increases the accuracy of the synchronization of the operations. One of the links is adjustable to arrest the table the required distance from the abutment to produce a clamping pressure on a sheet stock of any one of several different thicknesses sufficient to prevent it from slipping during the cutting operation, and simultaneously maintain the synchronization of the clamping and cutting operations to reproduce the last set clamping pressure at the beginning of the cutting operation on stocks having a thickness for which the last adjustment was made. A ratchet mechanism is provided for maintaining the adjusted position of the adjustment of the link, and means is also connected to the table to limit its movement away from the abutment and to prevent the table from rotating.

The advantages and objects of this invention will be more clearly understood by referring to the following description and the accompanying drawings, in which:

Fig. 1 is a side elevational view of a sole cutting machine embodying this invention, and showing parts of the frame broken away;

Fig. 2 is an enlarged front elevational view of a section of the machine, taken between and looking in the direction of the arrows 2—2 in Fig. 1; and Fig. 3 is a partial cross-sectional view of the adjustable stop and synchronizing link in the operating linkage taken on line 3—3 of Fig. 2.

As shown in Fig. 1, the sole stock 10 is supported upon a movable table 11 which is operated towards and away from an abutment 12 by means of a piston 13 cooperating with a cylinder 14. The piston is controlled by fluid pressure which may be admitted and exhausted through a pipe 15. The piston is moved towards the abutment 12 by the admission of fluid pressure and it is moved away from the abutment by the weight of the table and piston when the pressure is exhausted. Any suitable control valve may be provided in the pipe line 15 for thus controlling the fluid under pressure from any suitable source. When the piston 13 moves towards the abutment 12 the stock 10 is clamped between the table 11 and the abutment with a predetermined pressure which is automatically controlled by an adjustable stop 16 which strikes the bottom of the cylinder 14 and arrests the table a predetermined distance from the abutment 12, which is determined by the setting of the stop 16, which in turn is set in accordance with the thickness of the stock 10. Immediately after the desired clamping pressure is attained, a cutting knife 17 begins to operate upon the stock 10 to cut the soles therefrom.

The knife 17 is driven through a drive 18, which is connected and disconnected by a coupler, such as a clutch 19, to a source of power 20. The clutch 19 is operated in synchronism with the movable stop 16 to connect the drive 18 with the source of power 20 at approximately but before the end of the movement of the movable stop towards the bottom of the cylinder 14 which forms a fixed stop 21, and to disconnect the drive at approximately but after the beginning of the movement of the movable stop away from the fixed stop. That is the adjustment of the stop 16 and the clutch 19 is such that the stock 10 strikes the abutment 12, and after the desired clamping pressure is obtained, the knife 17 begins to operate and the table is stopped.

The synchronized actions of the stops 16 and 21 and the clutch 19 are controlled by a linkage 22 which is connected to the table 11 at one end and to the clutch 19 at the opposite end. The linkage comprises two rods 23 (Fig. 2) which are connected at one end to the table 11. The rods 23 extend downwardly from the table 11 at opposite sides of the cylinder 14, and their other ends are connected to a bar, or cross link 24 which extends diametrically underneath the cylinder 14. An adjustable link 25 in the linkage 22, comprising a screw 26, is threadedly connected to the bar 24. The movable stop 16 is supported on the upper end of the screw 26 and is adapted to engage the fixed stop 21 on the bottom of the cylinder 14. A hand wheel 27 is affixed to the screw 26 on the opposite side of the bar 24 for adjusting the length of the link 25 in the linkage. A swivel connection 28 is provided at the end of the link 25 to connect it with a link 29 forming a part of the remaining portion of the linkage which extends to the clutch 19.

A turnbuckle 30 (Fig. 1) having a lock nut 31 therefor is interposed between the link 29 and a member 32 forming a lost motion connection with a bell crank lever 33. The bell crank lever 33 is pivoted on the frame of the machine at 34, and its arm 35 is provided with a pin 36 which operates in a slot in the member 32. The pin 36 is adapted to engage the bottom of a slot 37 in the member 32 on the upward movement of the table 11 so as to actuate the other arm 38 of the lever 33. When the arm 38 is so actuated it moves to the left and engages, or exerts pressure on a spring 39 on a rod 40 having a wing nut 41 for adjusting the tension of the spring 39. The rod 40 is connected to the clutch lever 42 and is moved by the arm 38 through the action of the spring 39 to actuate the clutch lever 42 which is pivoted on the frame at 43. The end 44 of the lever 42 engages the clutch sleeve 45. The engagement of the bottom of the slot 37 in the member 32 with the pin 36 causes the arm 44 to be moved to the right, as viewed in Fig. 1, so as to cause the clutch 19 to connect the drive 18 to the source of power 20. When the member 32 is moved downwardly, the pin 36 on the arm 35 of the lever 33 is released and the weight of the arm 35 causes the arm 38 to move to the right against a stop 46 fixed to the rod 40 and thereby releases the clutch and disconnects the drive 18 from the source of power 20.

It will thus be seen that the engagement of the movable stop 16 against the fixed stop 21 at the bottom of the cylinder 14 controls the upward movement of the table 11. The stop 16 is provided with felt cushioning material 47 which is adapted to cushion the impact between the two stops. The position of the stop 16 relative to the stop 21 and the linkage is adjusted in accordance with the thickness of the sole material stock 10 by means of the hand wheel 27 and simultaneously changes the length of the connection between the bar 24 and the link 29 to maintain the synchronization of the cutting and clamping operations. When the stop 16 engages the stop 21 the screw 26 tends to be turned downwardly by the pressure between the two members. A ratchet 48 is provided to oppose such turning movement. The ratchet comprises an arm 49 which is pivoted with a hinge joint 49' on the cross arm 24 and swings downwardly into engagement with teeth 50, shown in Fig. 3, on the wheel 27. When the hand wheel 27 is turned counter-clockwise, or to the right, as viewed in Fig. 3, the stop 16 is moved upwardly. When the movement of the hand wheel 27 is reversed by the operator or by the pressure of the stop 16 against the stop 21, the swinging arm 49 engages one of the teeth 50 and prevents it from turning, but the arm 49 may be swung upwardly by the operator to disengage it from the teeth 50 to permit manual adjustment of the stop 16.

The table 11 is provided with a mechanism for limiting its downward movement away from the abutment 12. This mechanism comprises a threaded rod 51, as shown more clearly in Fig. 2, which is secured to the table 11. The lower end of the rod extends into a bore 52 of the bracket 53 on the frame to prevent the rotation of the table 11. A stop nut 54 is threaded on the rod 51 above the top of the bracket which forms a fixed stop 55 for the stop nut 54. The nut 54 is turned in the desired adjusted position on the rod 51 for limiting the downward movement of the table 11, and is locked in place by the lock nut 56. Leather cushion washers 57 are placed between the nuts 54 and 56 and between the nut 54 and the fixed stop 55 to provide cushions therebetween.

In the operation of the machine the sheet stock 10 of any selected thickness to be cut is placed on the table 11 and the stop 16 is positioned to arrest the table after the top surface of the stock has made contact with the abutment 12 and when the necessary clamping pressure has been exerted on the stock to prevent it from moving when the knife 17 begins to operate. This adjustment is made by turning the hand wheel 27 either in a counterclockwise direction as the teeth 50 swing the arm 49 out of their path, or in a clockwise direction as the operator holds the arm 49 out of the way of the teeth 50. The clutch 19 is adjusted to connect the knife drive 18 with the power source 20 just before the stop 16 is arrested by the fixed stop 21. That adjustment is made by first turning the wing nut 41 to adjust the spring 39 to the necessary tension to hold the clutch 19 in engagement under the pressure of the lever arm 38, and then turning the turnbuckle 30 so that the bottom of the slot 37 will engage the pin 32 to move the clutch sleeve 45 a sufficient distance to cause the engagement of the clutch 19 with the required pressure before the stop 16 is arrested. The turnbuckle 30 is then locked in place by the thumb nut 31. Thereafter the clutch operates automatically in any position of the movable stop 16 in which it may have been adjusted to obtain the proper clamping pressure for different thicknesses of the sole stock 10 to prevent it from moving under the knife when it is clamped between the table 11 and the abutment 12. The machine having been adjusted the forms are cut by admitting fluid pressure to the cylinder 14 which causes the piston 13, the table 11, and the movable stop 16 to rise until the stop 16 reaches the fixed stop 21 at the bottom of the cylinder. The clutch having been previously set to be thrown into engagement just before the movable stop 16 is arrested by the fixed stop 21, the knife 17 begins to operate just before the table 11 is stopped, but not until after sufficient clamping pressure has been applied.

After the cutting cycle has been completed the fluid pressure is released from the cylinder 14, and the table 11 descends by virtue of its own weight, and the linkage 22 connected thereto releases the pin 36 on the lever 33 and permits the weight of the lever arm 35 to disengage the clutch 19. In the downward movement of the table 11, the stop nut 54 on the rod 51 engages the bracket 53 for limiting the downward movement of the table 11. The stock is then placed in position for the next cut, and the operation is repeated.

While the preferred embodiment of my invention has been described herein, it will be understood that changes in details may be made therein without departing from the spirit of the invention and the scope of the appended claims.

Having thus described my invention, what I claim and desire to protect by Letters Patent is:

1. In a form cutting machine, an abutment, a table movable upwardly and downwardly for supporting and positioning the stock to be cut, a cylindrical piston fixed to said table for moving said table upwardly towards said abutment to clamp said stock between said table and said abutment, a fixed member, a projection attached to said table and slidably connected to said fixed member to prevent the rotation of said table, said projection being adapted to abut against said member to limit the downward movement of said table away from said abutment, a drive for a cutter adapted to cut said stock, a coupler for connecting and disconnecting said drive to a source of power, a fixed stop, a movable stop connected to said table and adapted to engage said fixed stop for arresting the upward movement of said table a predetermined distance from said abutment to limit the clamping pressure on said stock, a linkage carrying said movable stop and connecting said table and said coupler whereby said coupler is operated to connect said drive at approximately the end of the movement of said movable stop towards said fixed stop and to disconnect said drive at approximately the beginning of the movement of said movable stop away from said fixed stop, and means for adjusting said movable stop on said linkage to change the distance said table may be arrested from said abutment while maintaining the synchronized actions of said stops and said coupler.

2. In a form cutting machine, an abutment, a table movable upwardly and downwardly for supporting and positioning the stock to be cut, a cylindrical piston fixed to said table for moving said table upwardly towards said abutment to clamp said stock between said table and said abutment, a fixed member, a rod having one end attached to said table and another portion slideable in a bore in said fixed member to prevent the rotation of said table, said rod having an adjustable nut threaded thereon and adapted to be arrested by said fixed member to limit the downward movement of said table away from said abutment, means for locking said nut in its desired adjusted position, a drive for a cutter adapted to cut said stock, a coupler for connecting and disconnecting said drive to a source of power, a fixed stop, a movable stop connected to said table and adapted to engage said fixed stop for arresting the upward movement of said table a predetermined distance from said abutment, a linkage carrying said movable stop and connecting said table and said coupler whereby said coupler is operated to connect said drive at approximately the end of the movement of said movable stop towards said fixed stop and to disconnect said drive at approximately the beginning of the movement of said movable stop away from said fixed stop, means for adjusting said movable stop on said linkage to change the distance said table may be arrested from said abutment and to maintain the synchronized actions of said stops and said coupler, said adjustable means comprising a screw threaded member carrying said movable stop and forming a link threadedly connected to said linkage, means for operating said member, and a ratchet for preventing said member from being turned by the pressure of said movable stop against said fixed stop.

3. In a sole cutting machine, an abutment, a table movable upwardly and downwardly for supporting and positioning the sole stock to be cut, means for moving said table upwardly towards said abutment to clamp said stock between said table and said abutment, a drive for a cutter adapted to cut said stock, a coupler for connecting and disconnecting said drive to a source of power, a fixed stop, a movable stop connected to said table and adapted to engage said fixed stop for arresting the upward movement of said table a predetermined distance from said abutment, a linkage carrying said movable stop and connecting said table and said coupler whereby said coupler is operated to connect said drive at approximately the end of the movement of said movable stop towards said fixed stop and to disconnect said drive at approximately the beginning of the movement of said movable stop away from said fixed stop, means for adjusting said movable stop on said linkage to change the distance said table may be arrested from said abutment and to maintain the synchronized actions of said stops and said coupler, said adjustable means comprising a screw threaded link carrying said movable stop and threadedly connected to said linkage, means for turning said link, and a ratchet for preventing said link from being turned by the pressure of said movable stop against said fixed stop.

4. In a sole cutting machine, an abutment, a table movable upwardly and downwardly for supporting and positioning the sole stock to be cut, means for moving said table upwardly towards said abutment to clamp said stock between said table and said abutment, a drive for a cutter adapted to cut said stock, a coupler for connecting and disconnecting said drive to a source of power, a fixed stop, a movable stop connected to said table and adapted to engage said fixed stop for arresting the upward movement of said table a predetermined distance from said abutment, a linkage carrying said movable stop and connecting said table and said coupler whereby said coupler is operated to connect said drive at approximately the end of the movement of said movable stop towards said fixed stop and to disconnect said drive at approximately the beginning of the movement of said movable stop away from said fixed stop, means for adjusting said movable stop on said linkage to change the distance said table may be arrested from said abutment and to maintain the synchronized actions of said stops and said coupler, said adjustable means comprising a screw carrying said movable stop, said screw forming a link in said linkage and connected therein at one section by screw threads and at another section by a swivel connection, means for operating said screw, and a ratchet for preventing said screw from being turned by the pressure of said movable stop against said fixed stop.

5. In a form cutting machine an abutment, a table for supporting the stock from which the form is to be cut, a cylinder having a closed head, a piston in said cylinder for moving said table towards said abutment, a drive for a cutter adapted to cut said stock, a coupler for connecting and disconnecting said drive to a source of power, a fixed stop consisting of the closed cylinder head, a movable stop adapted to engage said fixed stop and arrest the movement of said table a predetermined distance from said abutment to limit the clamping pressure on said stock, means for actuating said coupler to connect said knife drive to a source of power when said stock is clamped, means for synchronizing the acts of clamping the stock and actuating said coupler comprising a positive mechanical linkage between said table and said coupler, said linkage comprising a cross link which is connected to said table at opposite sides of said cylinder and extends across the closed head of said cylinder, an adjustable link having a screw threaded connection with said cross link and connected to the portion of the linkage which is connected to said coupler, said movable stop being carried by said adjustable link, means for turning said adjustable link to change the distance said table may be arrested from said abutment to obtain the desired clamping pressure on stocks of different thicknesses, and a ratchet for preventing the threaded connection on said adjustable link from being turned by the pressure between said stops.

CHARLES J. STUART.

REFERENCES CITED

The following references are of record in the file of this patent:

UNITED STATES PATENTS

| Number | Name | Date |
| --- | --- | --- |
| 1,270,319 | Patten | June 25, 1918 |
| 1,418,604 | Patten | June 6, 1922 |
| 1,645,411 | McGowan | Oct. 11, 1927 |
| 2,284,308 | Stuart | May 26, 1942 |